United States Patent
Holderried et al.

(10) Patent No.: US 10,207,666 B2
(45) Date of Patent: Feb. 19, 2019

(54) BUMPER FOR A VEHICLE

(71) Applicant: GM GLOBAL TECHNOLOGY OPERATIONS LLC, Detroit, MI (US)

(72) Inventors: Stefan Holderried, Ruesselsheim (DE); Tommy Hechtel, Ruesselsheim (DE); Fabian Fuerst, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/625,574

(22) Filed: Jun. 16, 2017

(65) Prior Publication Data

US 2017/0361794 A1    Dec. 21, 2017

(30) Foreign Application Priority Data

Jun. 16, 2016    (DE) .......................... 10 2016 007 371

(51) Int. Cl.
| | |
|---|---|
| *B60R 19/34* | (2006.01) |
| *B60R 19/03* | (2006.01) |
| *B60R 19/18* | (2006.01) |
| *B60R 19/30* | (2006.01) |

(52) U.S. Cl.
CPC .............. *B60R 19/34* (2013.01); *B60R 19/03* (2013.01); *B60R 19/18* (2013.01); *B60R 19/30* (2013.01); *B60R 2019/1853* (2013.01)

(58) Field of Classification Search
CPC ......... B60R 19/03; B60R 19/30; B60R 19/34; B60R 2019/1853; B60R 2019/1833
USPC ....................................... 293/102, 132, 133
See application file for complete search history.

(56) References Cited

U.S. PATENT DOCUMENTS

| | | | | |
|---|---|---|---|---|
| 7,044,515 | B2* | 5/2006 | Mooijman .............. | B60R 19/18 293/102 |
| 7,665,777 | B2* | 2/2010 | Mellis ..................... | B60R 19/18 293/102 |
| 7,959,197 | B2* | 6/2011 | Agrahari ................. | B60R 19/18 293/102 |
| 8,439,411 | B2* | 5/2013 | Cave ..................... | B29C 65/342 293/102 |
| 2004/0262931 | A1* | 12/2004 | Roussel .................. | B60R 19/18 293/120 |
| 2009/0273197 | A1* | 11/2009 | Muskos ................ | B60R 19/023 293/132 |
| 2013/0119683 | A1* | 5/2013 | Blumel .................. | B21D 53/88 293/133 |

(Continued)

FOREIGN PATENT DOCUMENTS

| | | |
|---|---|---|
| DE | 202008012398 U1 | 2/2010 |
| DE | 102009014244 A1 | 11/2010 |

(Continued)

OTHER PUBLICATIONS

German Patent and Trade Mark Office, German Search Report for German Patent Application No. 10 2016 007 371.3, dated May 2, 2017.

*Primary Examiner* — Gregory A Blankenship
(74) *Attorney, Agent, or Firm* — Lorenz & Kopf, LLP

(57) ABSTRACT

A bumper for a vehicle includes a bumper crossbeam and two crash boxes extending away from a back of the bumper crossbeam. A one-piece blank made of fiber-reinforced sheet material extends from a wall section of the bumper crossbeam connecting the crash boxes, right into the crash boxes.

12 Claims, 3 Drawing Sheets

(56) References Cited

U.S. PATENT DOCUMENTS

| | | | |
|---|---|---|---|
| 2013/0175813 A1* | 7/2013 | Mana | B60R 19/18 |
| | | | 293/120 |
| 2014/0367982 A1* | 12/2014 | Kano | B60R 19/18 |
| | | | 293/121 |
| 2016/0001722 A1* | 1/2016 | Nickel | B60R 19/18 |
| | | | 293/120 |
| 2016/0001723 A1* | 1/2016 | Oku | B60R 19/03 |
| | | | 293/121 |
| 2017/0106822 A1* | 4/2017 | Steinebach | B60R 19/03 |
| 2017/0253204 A1* | 9/2017 | Venkat | B60R 19/18 |
| 2017/0361794 A1* | 12/2017 | Holderried | B60R 19/03 |
| 2018/0037179 A1* | 2/2018 | Steinebach | B22D 25/02 |
| 2018/0141512 A1* | 5/2018 | Munjurulimana | B60R 19/18 |

FOREIGN PATENT DOCUMENTS

| | | |
|---|---|---|
| DE | 102009035777 A1 | 2/2011 |
| DE | 102014009941 A1 | 1/2016 |
| EP | 1334882 A1 | 8/2003 |

* cited by examiner

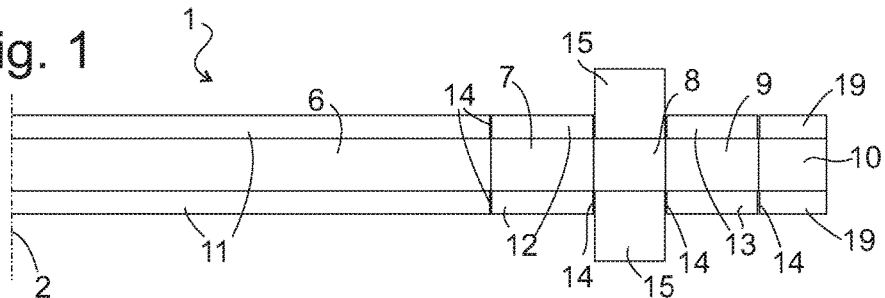
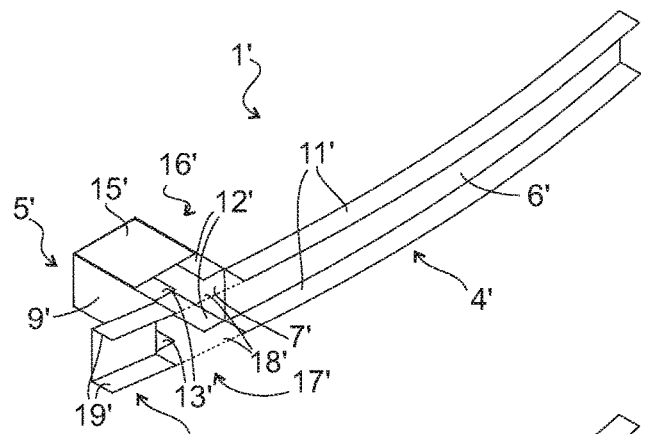
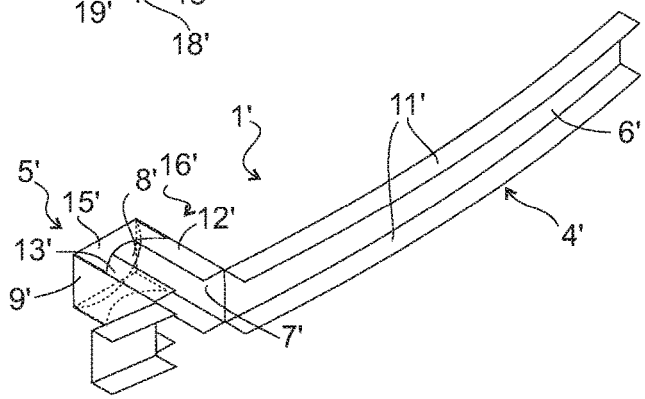
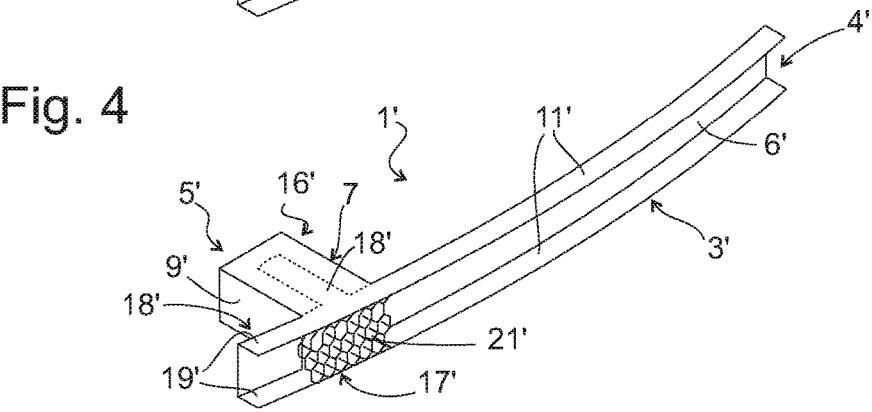

BUMPER FOR A VEHICLE

CROSS-REFERENCE TO RELATED APPLICATION

This application claims priority to German Patent Application No. 102016007371.3, filed Jun. 16, 2016 which is incorporated herein by reference in its entirety.

TECHNICAL FIELD

The present disclosure pertains to a bumper for a vehicle, in particular for a passenger car.

BACKGROUND

To reduce fuel consumption, opportunities to reduce vehicle weight are widely sought. DE 10 2014 009 941 A1 proposes that conventional bumpers made of steel or aluminum be replaced by bumpers in which the crossbeam is formed of a fiber-reinforced plastic blank.

Crash boxes, which connect the crossbeam with the chassis of the vehicle are injection molded onto the crossbeam. They are open on the side facing the chassis and, because of the necessary demolding incline, their walls become thinner towards the chassis. Too thin a wall thickness encourages the crash boxes to break under pressure at the chassis-side end, rendering the bumper useless. Too thick a wall thickness prevents the buckling of the crash box at its bumper-side end which equally restricts its effectiveness.

SUMMARY

The present disclosure provides a bumper which may be economically manufactured from fiber-reinforced plastic sheet material, and in which the crash boxes may be relied on to absorb a high level of impact energy. In an embodiment of the present disclosure, a bumper for a vehicle include a bumper crossbeam and two crash boxes protruding from the back of the bumper crossbeam. A one-piece blank made of fiber-reinforced sheet material extends from a wall section of the crossbeam connecting the crash boxes, right into the crash boxes. In this way, the crash boxes also benefit from the high load-bearing capacity of the fiber-reinforced sheet material and because the wall areas of the crash boxes, which are formed from the sheet material, do not require a strength which varies in demolding direction. As a result, both the risk of breakage at a thin-walled end and excess rigidity at a thick-walled end may be avoided.

The blank should form at least two vertical side walls of the crash boxes. Such side walls may together with the wall sections connecting the crash boxes be obtained economically, with little waste, in that strip-shaped blanks are made from the sheet material the longitudinal ends of which are subsequently angled to form the side walls.

In particular, if the vertical side walls of the crash boxes made from the blank face each other on either side of the connecting wall section, it is possible for the crash boxes to be open at the ends facing the crossbeam, so that if the crash box is to be reinforced with extra molded-on material, it is possible to achieve a rigidity which increases from the bumper crossbeam towards the chassis, and a secure attachment to the chassis.

If the strip is sufficiently wide the blank may include at least one flange which is angled at either an upper or a lower edge of the crash boxes, to form at least a part of an upper or lower wall of the crash box.

Further, the blank may form a base plate on an end of each crash box that faces away from the bumper crossbeam. The base plate may stabilize the contiguous crash box walls and/or serve as an anchoring to the chassis. In both cases the high load-bearing capacity of the fiber-reinforced sheet material is beneficial for the stability of the whole bumper.

To further increase its load-bearing capacity, the base plate may be formed as an arch.

A stiffening structure, which is supported against the base plate to stabilize the side walls or upper and lower walls of the crash box, may be molded onto the base plate inside the crash box.

A flange of the blank extending from the base plate may form at least a part of an upper or lower wall of the crash box. Such a flange may also form a mounting flange for attaching the bumper to the vehicle chassis.

To be able to produce the blanks with minimal waste, sections of the blank which form the wall section of the bumper crossbeam connecting the crash boxes, a first crash box side wall, the base plate, and a second crash box side wall, preferably lie in a row one behind the other.

The blank may have flanges angled off an edge of the first and second wall, which are joined together to form an upper or lower crash box wall.

To achieve a high tear strength in one wall of a crash box wall that is not formed by a single contiguous piece of the blank, two flanges of the blank may overlap in one crash box wall.

If the blank in one crash box wall has a gap, this should be filled with injection-molded plastic to maintain the tear strength.

To achieve a sufficient bending strength of the middle section of the bumper extending between the crash boxes, the blank should include at least one bar which is angled off along an upper or lower edge of the wall section connecting to the crash boxes. Such a flange is preferably provided on the upper and the lower edge. The angle between the connecting wall section and the bar is preferably a right-angle.

To ensure that the bumper is sufficiently rigid also on either side of the crash boxes, the blank, preferably including an angled-off bar, should extend right into end pieces of the bumper crossbeam, which protrude on both sides of the crash boxes.

BRIEF DESCRIPTION OF THE DRAWINGS

The present disclosure will hereinafter be described in conjunction with the following drawing figures, wherein like numerals denote like elements.

FIG. 1 shows a plan view of a blank for making a bumper according to a first embodiment of the present disclosure;

FIG. 2. shows a perspective view of the bumper produced from the blank;

FIG. 3 shows a further development of the bumper in FIG. 2;

FIG. 4 shows the bumper with molded-on stiffening structures in the crash box;

DETAILED DESCRIPTION

Figure 5:
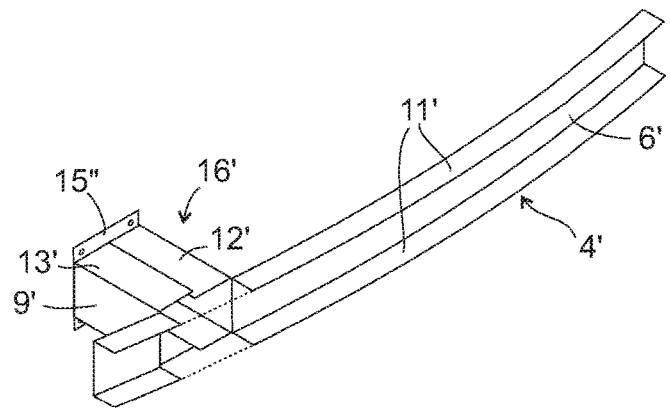
FIG. 5 shows a modification of the bumper in FIG. 2.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a plan view of a blank 1 made from a fiber-reinforced composite sheet material such as, for example, an organic sheet which is to be further processed into a bumper, in that it is draped over a hollow mold of a molding tool, the blank 1 plasticized by heating is sucked and/or pressed by a stamp into the hollow mold and, once the blank is tightly encased by the hollow mold and stamp, plastic material is injected into the hollow mold to fix the blank into the resulting shape. FIG. 2 shows the bumper 1' produced by molding it in the tool.

The blank 1 is symmetrical in relation to a central plane of the vehicle 2. Thus, in each of FIGS. 1 and 2 as in all the further figures, only one half of the blank 1 or the resulting bumper 1' is depicted.

In the following text, parts of the blank 1 and the parts of the bumper 1' formed by those parts of the blank 1, have the same reference symbols, wherein the bumper and its parts are identified by a prime (').

A central rectangular area 6 of the blank elongated transversely to the central plane 2 of the vehicle is provided to form a vertical wall 6' of a central section 3' of a crossbeam 4' of the bumper 1' between two crash boxes 5'.

More compact rectangular areas 7 extending the central area 6 at both ends are provided, in order, when shaping the blank 1, to form facing or inner side walls 7' of the crash boxes 5', which adjoin the central wall 6' of the bumper 2'.

The areas 7 are joined to areas 8 which are provided to form a base plate 8' of the crash box 5' at the free end thereof facing the vehicle interior; the latter in turn are followed by areas 9, each of which will form sidewalls 9' of the crash box 5', which face away from each other or are external.

Areas 9 finally are joined to areas 10 which, in the finished bumper, extend in an extension of the central wall 4' on both sides of the crash boxes 5'.

The fiber cores of the areas 6 to 10 in the finished bumper thus form a continuous fiber tape, which extends over the whole width of the bumper crossbeam 4' from one end to the other and thus extends through the side walls 7', 9', and bases 8' of the crash boxes 5'.

Strip-shaped areas 11 adjoin the central area 6 at the top and the bottom. In the finished bumper 1' they form the stiffening bars 11' which are bent over at right angles along the upper and lower edges of the central wall 6'. In FIG. 2 the bars 11' protrude on a side of the central wall 6' facing away from the crash boxes 5', so that the bumper crossbeam 4' forms a channel which opens towards the vehicle exterior; according to a variation not shown, they could also be bent towards the vehicle interior.

In the same way as for the central area 6, areas 7 and 9 are also both flanked by strip-shaped areas 12, 13, wherein a cut 14 is made between a strip-shaped area and the adjoining area 12, to be able to bend the blank 1 along the border between the areas 6 and 7.

Above and below the area 8, flaps 15 are provided which are wider than the strip-shaped areas 11, 12, 13.

On closing the molding tool, the strip-shaped areas 12, 13 are bent over at right angles in order respectively to form parts 12', 13' of an upper wall 16' or lower wall 17' of the crash boxes 5'. In the same way, the flaps 15 are turned down at right angles. The resulting wall parts 15' overlap with the parts 12', 13' and are fixed to them, for example, by melting their thermoplastic matrix parts or by molding thermoplastic material onto them in the molding tool. As indicated in FIG. 2 by a dotted edge contour, the molded-on thermoplastic material may also serve to fill gaps 18' in the walls 16', 17', into which the parts 12, 13, 15 of the blank 1 do not extend, or to extend the bars 11' over the crash boxes 5' and to connect them to bars 19' on the end pieces 20' of the bumper crossbeam 1' extending beyond the crash boxes 5'.

According to a further development depicted in FIGS. 3 and 4, the base plate 8' of the crash boxes 5' is a dome-shaped arch. Since the blank 1 is essentially inflexible on account of its fiber core, material for forming the arch must be able to be drawn/flow from the sides into the base plate 8'. In the case of FIG. 3, this material is taken from the flaps 15, for which reason the wall sections 15' formed by them have obtained concave curved edges.

Molded-on plastic material inside the molding tool is not depicted in FIG. 3, so that the wall parts 12', 13', 15', may be more clearly shown; FIG. 4 shows the same bumper with the molded-on material as it is extracted from the molding tool. As in FIG. 2, the material fills in the gaps 18' in the walls 16', 17'; in addition, it forms a stiffening structure 21' in the interior of the crash boxes 5', for example, as shown in the form of a honeycomb open towards the exterior of the bumper 1', the walls of which are supported by the base plate 8' which owes its high load-bearing capacity to its arched shape. Since the part of the molding tool with which the stiffening structure 21' is formed, must disengage from the crash boxes 5' towards the external side when demolding, the strength of the walls of the stiffening structure 21' decreases from the base plate 8' towards the outside. Thus, in the event of a collision, the outer part of the crash box 5' facing the crossbeam 4' is the first to give way, and the deformation only spreads in the direction of the base with the increasing severity of the collision. An anchoring of the base plate 8' to the chassis, typically to the ends of the longitudinal beams of the vehicle, is not therefore at any significant risk of failing in the event of a collision.

In FIG. 4 the stiffening structure 21' is only depicted in the crash box 5', but it may also extend further past the side walls 7', 9', between the bars 11', 19', and, if necessary, over the whole width of the bumper 1' to stiffen the end pieces 18' and/or the central section 3' of the bumper crossbeam 4'.

According to a modification shown in FIG. 5, the flaps 15 on both sides of the base plate 8' are not angled towards the crash box 5' walls 16', 17, but instead are left in the same plane at the end of the crash box 5' facing the vehicle interior, to form mounting flanges 15'' for anchoring the bumper 1' to longitudinal beams of the vehicle chassis which are not depicted.

In this case, the strip-shaped areas 12, 13 may be made wider than in the case of FIG. 2 so the wall parts 12', 13' formed by them overlap in the middle of 16', 17' after being angled-off as in the Fig., and may be fixed flat to one another. Alternatively, a gap between the wall parts 12', 13' may extend the whole length of the crash box 5' and be filled with molded-on thermoplastic material.

Figure 6:
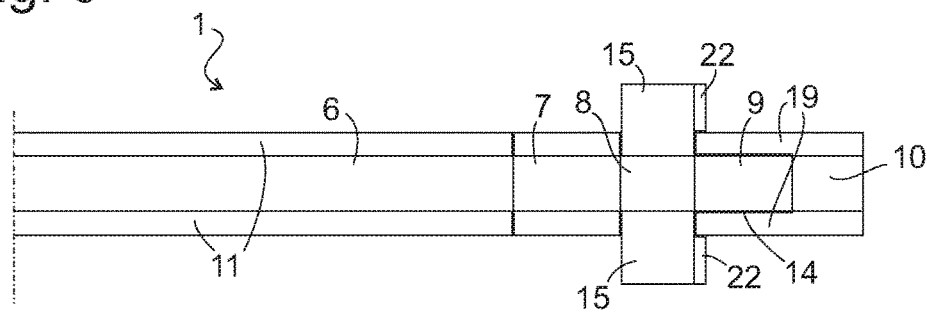
FIG. 6 shows a plan view of a modified blank.
Figure 7:
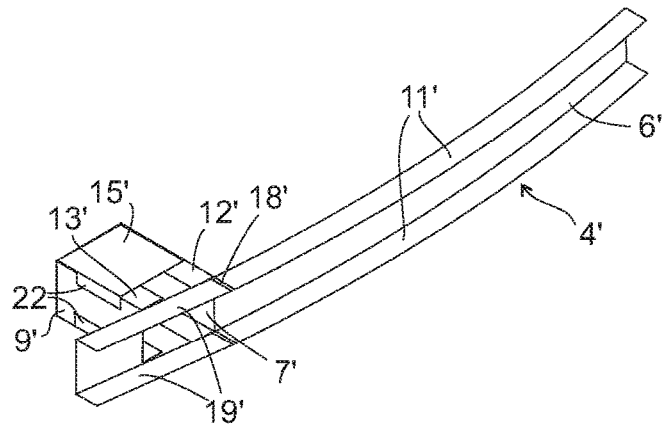
FIG. 7 shows a perspective view of the bumper produced from the blank in FIG. 6.

FIG. 6 shows a modified embodiment of the blank 1. In this case, the strip-shaped areas 13 above and below the side wall areas 9 are absent. Instead, the strip-shaped areas 19 which flank the area 10 are extended along the side wall area 9, and the flaps 15 are made wider by edge strips 22 on their edges facing areas 9, 10. When shaping the blank 1 in the molding tool, not only are areas 7, 9 and the flaps 15 bent into right angles towards the areas 8 to form the base plate 8' and the walls 7', 9', 16', 17' of the crash box 5', but the edge strips 22 are also bent towards the flaps 15 in order that they may be fixed to the outer side wall 9' as shown in FIG. 7, and thus to ensure, despite the absence of the bar 13' that the fibers in the blank 1 span the edges between the wall 9' and the walls 16', 17' of the crash box 5'. The elongated bars 19' largely span the crash box 5' so that only a narrow gap 18' between the ends thereof and the bars 11' remains to be filled by molding on thermoplastic material, or the bars 11', 19' even overlap somewhat.

Figure 8:
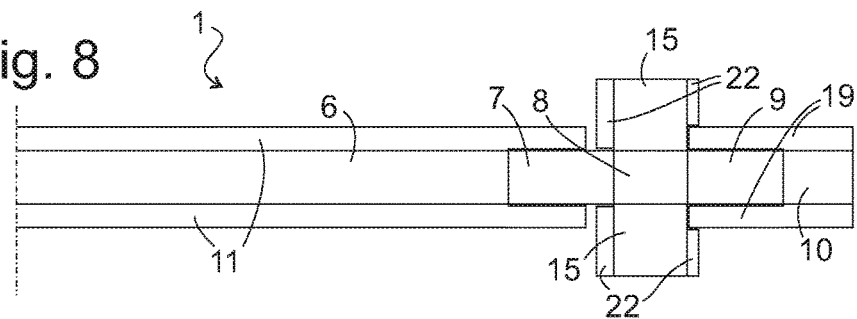
FIG. 8 shows a plan view of a further modified blank.
Figure 9:
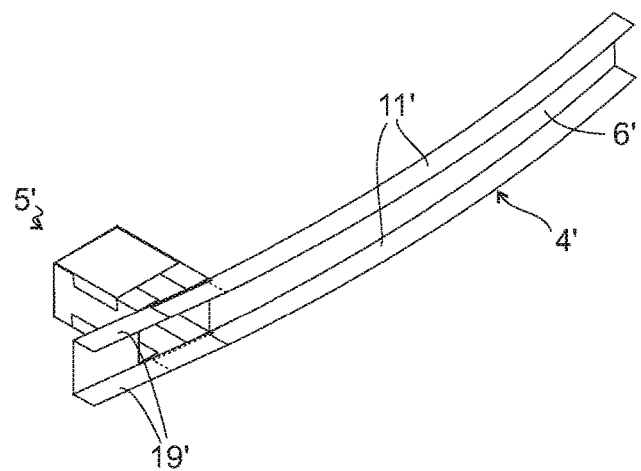
FIG. 9 shows a perspective view of the bumper produced from the blank in FIG. 8.

In the embodiment in FIG. 8 or FIG. 9 this approach is also applied to the inner side wall 7': in area 7 of the blank 1 (see FIG. 8) the bars 12 are absent; instead the bars 11 are extended along the areas 7 and edge strips 22 are also provided on the side of the flaps 15 facing areas 6, 7, to be fixed to the inner side wall 7' when the bumper 1 is molded. The bars 11', 19' are now long enough so that they overlap in front of the crash box 5' and can also be fixed to one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bumper for a vehicle comprising:
   a bumper crossbeam; and
   two crash boxes protruding from a back of the bumper crossbeam, the bumper crossbeam and crash boxes formed with a one-piece blank made of fiber-reinforced sheet material, the one-piece blank extending from a wall section of the bumper crossbeam directly into the crash boxes such that the one-piece blank forms a pair of opposing vertical side walls of each crash box extending from the wall section of the bumper crossbeam.

2. The bumper according to claim 1, wherein the one-piece blank comprises at least one area which is angled-off at an upper or lower edge of the side wall of one of the crash boxes to form at least one part of an upper or lower wall of the crash box.

3. The bumper according to claim 1, wherein the one-piece blank forms a base plate at an end of each crash box facing away from the bumper crossbeam.

4. The bumper according to claim 3, wherein the base plate is formed as an arch.

5. The bumper according to claim 4, wherein a stiffening structure supported against the base plate inside the crash box is molded-on.

6. The bumper according to claim 3, wherein an area of the one-piece blank extending from the base plate forms at least a part of an upper or lower wall of the crash box.

7. The bumper according to claim 3, wherein an area of the one-piece blank extending from the base plate forms a mounting flange for attaching the bumper to a vehicle chassis.

8. The bumper according to claim 3, further comprising a plurality of consecutive areas of the one-piece blank forming the wall section of the bumper crossbeam and connecting the crash boxes, a first side wall of the crash box, the base plate and a second side wall of the crash box.

9. The bumper according to claim 8, wherein each consecutive area of the one-piece blank forms a part of the wall section and at least one of the first and second side walls of the crash box.

10. The bumper according to claim 1, wherein a gap between the opposing vertical side walls of the one-piece blank in at least one of the crash boxes is filled with injection-molded plastic.

11. The bumper according to claim 1, wherein the one-piece blank comprises at least one bar which is angled off the wall section connecting the crash boxes along an upper or lower edge.

12. The bumper according to claim 1, wherein the bumper crossbeam comprises end pieces which protrude on either side of the crash boxes and the one-piece blank extends into the end pieces of the bumper crossbeam.

* * * * *